(12) United States Patent
Oh et al.

(10) Patent No.: US 8,887,079 B2
(45) Date of Patent: Nov. 11, 2014

(54) TERMINAL AND METHOD OF STORING AND EXECUTING CONTENTS THEREOF

(75) Inventors: Jung Yeob Oh, Seongnam-si (KR); Ji Sun Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1114 days.

(21) Appl. No.: 12/194,901

(22) Filed: Aug. 20, 2008

(65) Prior Publication Data

US 2009/0070695 A1    Mar. 12, 2009

(30) Foreign Application Priority Data

Sep. 6, 2007   (KR) .......................... 10-2007-0090470

(51) Int. Cl.
    *G06F 3/048*    (2013.01)
(52) U.S. Cl.
    USPC ............ 715/769; 715/764; 715/847; 715/864
(58) Field of Classification Search
    USPC ................................................. 715/769, 847
    See application file for complete search history.

(56) References Cited

U.S. PATENT DOCUMENTS

| | | | | |
|---|---|---|---|---|
| 5,544,295 A | * | 8/1996 | Capps ........................... | 715/769 |
| 5,745,111 A | * | 4/1998 | Cline et al. .................... | 715/769 |
| 6,426,761 B1 | * | 7/2002 | Kanevsky et al. ............. | 715/764 |
| 6,433,800 B1 | * | 8/2002 | Holtz ............................. | 715/835 |
| 2003/0164862 A1 | * | 9/2003 | Cadiz et al. .................... | 345/838 |
| 2003/0184587 A1 | * | 10/2003 | Ording et al. ................. | 345/769 |
| 2005/0289476 A1 | * | 12/2005 | Tokkonen ....................... | 715/769 |
| 2007/0162872 A1 | | 7/2007 | Hong et al. | |
| 2008/0259045 A1 | * | 10/2008 | Kim et al. ...................... | 345/173 |

FOREIGN PATENT DOCUMENTS

KR    10-2007-0067332    6/2007

OTHER PUBLICATIONS

Paul McFedries et al., "Insider Power Techniques for Microsoft Windows XP," Feb. 12, 2003, Microsoft Press, pp. 109-111.*

* cited by examiner

*Primary Examiner* — Weilun Lo
*Assistant Examiner* — Dino Kujundzic
(74) *Attorney, Agent, or Firm* — H.C. Park & Associates, PLC

(57) ABSTRACT

A terminal and a method of storing and executing contents thereof are provided. The method of storing and executing contents of a terminal includes displaying a container to store contents on a screen, selecting a content and storing the content in the container, displaying the stored content and an application corresponding thereto if the container is selected, and executing the corresponding content if the specific content and an application corresponding thereto are selected.

18 Claims, 11 Drawing Sheets

TERMINAL AND METHOD OF STORING AND EXECUTING CONTENTS THEREOF

CROSS REFERENCE TO RELATED APPLICATION

This application claims priority from and the benefit of Korean Patent Application No. 10-2007-0090470, filed on Sep. 6, 2007, which is hereby incorporated by reference for all purposes as if fully set forth herein.

BACKGROUND OF THE INVENTION

1. Field of the Invention

The present invention relates to a terminal and a method of storing and executing contents thereof, and more particularly, to a terminal and a method of storing and executing contents thereof that may manage and easily execute contents of different applications.

2. Discussion of the Background

Nowadays, terminals are more widely used and can perform various functions in addition to a communication function. That is, terminals increasingly have various functions and store a large amount of information, including various contents that can be executed by a user request.

However, when searching for contents of a terminal, a user may need to enter a corresponding menu and search for contents to execute. Further, because the terminal arranges the corresponding contents in a list or lattice form in each menu, it may not be easy for the user of the terminal to select a content to execute.

Further, the terminal may separately manage contents on an application basis. That is, image files may be managed together only with other image files, music files may be managed only with other music files, and messages may be managed only with other messages.

SUMMARY OF THE INVENTION

The present invention provides a terminal and a method of storing and executing contents thereof having a container to store contents executed in different applications together.

The present invention further provides a terminal and a method of storing and executing contents thereof that may display stored contents and applications corresponding thereto together and execute a desired content, when a container is selected.

The present invention further provides a terminal and a method of storing and executing contents thereof that may display related contents and execute an application using the displayed contents, when a container is selected while a specific application is executed.

Additional features of the invention will be set forth in the description which follows, and in part, will be apparent from the description, or may be learned by practice of the invention.

The present invention discloses a method of storing contents of a terminal including displaying a container and at least one content, selecting a content among the at least one content, and storing the selected content in the container.

The present invention also discloses a method of executing contents of a terminal including displaying a stored content and an application corresponding thereto when a container displayed on a screen is selected, and executing a specific content if the specific content and an application corresponding thereto are selected.

The present invention also discloses a terminal including a touch screen to display a container and at least one content, and a controller to select a content from among the at least one content and store the selected content in the container.

The present invention also discloses a terminal including a touch screen to display a container, and a controller to cause stored contents and applications related to the stored contents to be displayed if the container is selected, and to execute a specific content if the specific content and an application corresponding thereto are selected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
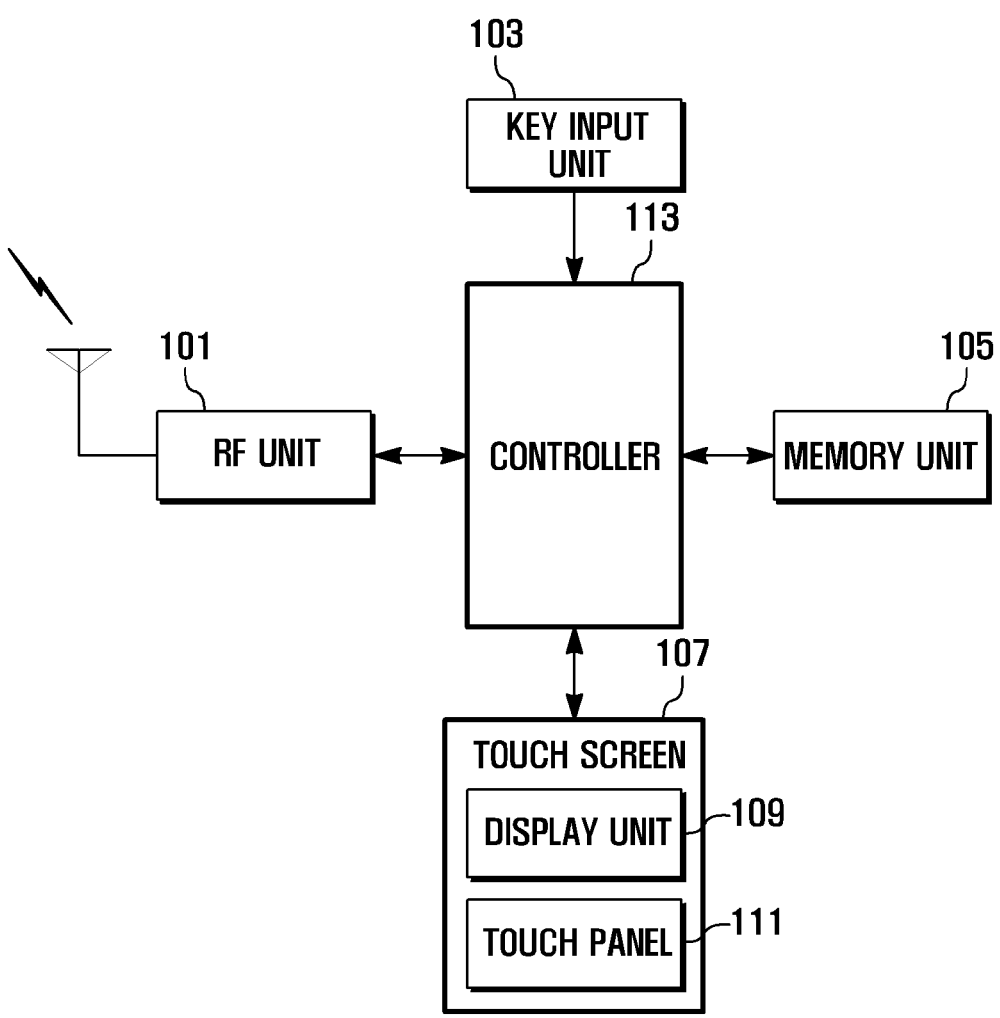
FIG. 1 is a block diagram showing a configuration of a terminal for storing and executing contents according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In exemplary embodiments of the present invention, the term "touch" indicates a state in which a touch screen is touched by a user's hand or a stylus. The term "drag" indicates an operation in which a user moves a finger or a stylus while touching a touch screen. The term "drop" indicates an operation in which a user removes a finger or a stylus from a touch screen. Therefore, the term "drag and drop" indicates an operation in which a user moves a finger or stylus while touching a touch screen and then removes the finger of stylus from the touch screen.

Further, the term "content" indicates information that a user of a terminal can check after storing and selecting, as needed. For example, a content may be phone number information, a message, an MP3 file, an image file, or a text file. The term "application" indicates a program to provide an operation and may be called an application program. Each application is applied to a specific type of content. For example, if the application is an image album viewer, the application may enable a stored image file content to be displayed.

The terminal according to an exemplary embodiment of the present invention is a terminal having a touch screen, and may be an information communication appliance and multimedia appliance such as a mobile terminal, mobile phone, wired/wireless phone, portable multimedia player (PMP), personal digital assistant (PDA), smart phone, MP3 player, or applications thereof. A terminal according to exemplary embodiments of the present invention may have a local area radio communication module.

FIG. 1 is a block diagram showing a configuration of a terminal for storing and executing contents according to an exemplary embodiment of the present invention.

Referring to FIG. 1, the terminal includes a radio frequency (RF) unit 101, a key input unit 103, a memory unit 105, a touch screen 107, and a controller 113.

The RF unit 101 performs a wireless communication function of the terminal. The RF unit 101 includes an RF transmitter to up-convert a frequency of a signal to be transmitted and amplify the signal, and an RF receiver to low-noise amplify a received signal and down-convert a frequency of the signal. The RF unit 101 transmits and receives a message in the present exemplary embodiment. The message may be used in a message service, such as a Short Message Service (SMS), a Multimedia Message Service (MMS), or an Enhanced Message Service (EMS).

In the present exemplary embodiment, a configuration of a terminal having the RF unit 101 is described with reference to the drawings, however the present invention is not limited thereto. The RF unit 101 may be omitted. In order to exchange information between terminals, the terminal may include a local area radio communication module, for example a Bluetooth® module.

The key input unit 103 receives a user manipulation signal to control operation of the terminal. The key input unit 103 performs a manipulation according to user input such as advancing to a specific mode, selection of a specific content, and writing of a message in a message writing mode. The specific mode may be an image album mode, an MP3 mode, a phone book mode, a memo mode, or a message writing mode. The content may be an image file, a music file, phone number information, or a text file.

The memory unit 105 stores a program and information necessary for operation of the terminal. The memory unit 105 stores several applications and contents in the present exemplary embodiment. The application may be an image album viewer, an MP3 player, a phone book, a memo pad, a message, Bluetooth®, or a wastebasket. The memory unit 105 stores contents to execute in each application corresponding thereto. The memory unit 105 may store contents that can be executed in several kinds of applications in a container. The container may be a folder in the memory unit 105 that may be used to store both a content and an application corresponding thereto. When storing contents in the container, selected contents for storage may not be deleted from their original location, but copied and stored in the container.

The touch screen 107 includes a display unit 109 and a touch panel 111. The touch screen 107 performs a function as an input unit. The display unit 109 displays a state of the terminal. In this case, the display unit 109 uses a liquid crystal display (LCD) and includes an LCD controller, a memory to store display data, and an LCD display element. The touch panel 111 is mounted on a surface of the display unit 109 and includes a touch detection unit and a signal converter. When a touch occurs, the touch detection unit detects a change in a value of a physical characteristic, for example resistance and capacitance, and thereby detects the occurrence of the touch. Further, the signal converter converts the change of the physical characteristic to a touch signal.

The touch screen 107 visually displays various information related to the state and operation of the terminal. The touch screen 107 may display a container in all modes. The container may be displayed at a lower part of the right side of the touch screen 107. The touch screen 107 detects a touch by the user.

Figure 7A:
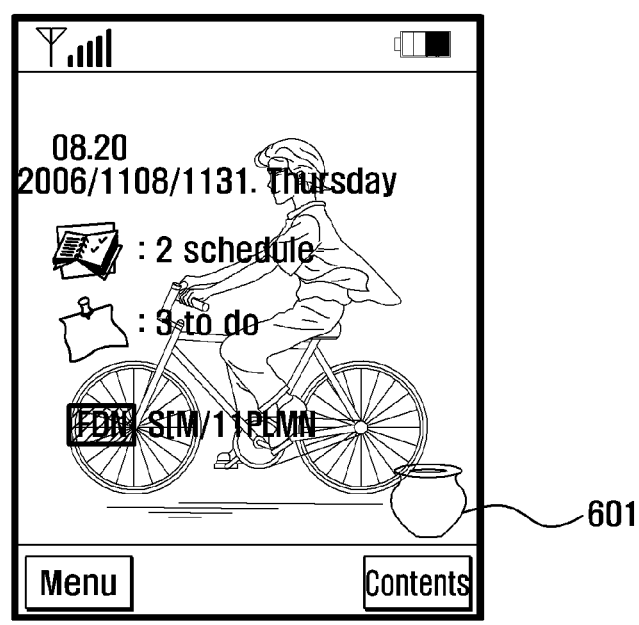
FIG. 7A, FIG. 7B, and FIG. 7C show examples of screens in the method of FIG. 6.
Figure 7B:
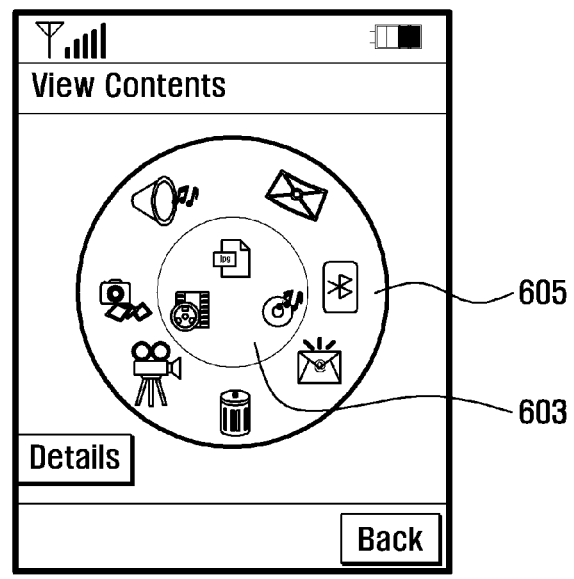

When a container is selected in a standby mode, the touch screen 107 displays icons of contents stored in the container at a central part of the touch screen 107, and displays icons of applications related to contents around the content icons in the central part. The displayed application may always include a wastebasket. For example, if an image file, a moving image file, and a music file are stored in the container, the touch screen 107 displays icons of the corresponding files at a central part of the screen and displays icons of applications related to the corresponding files, for example icons of an image viewer, a moving image viewer, an MP3 player, Bluetooth®, a message writing, E-mail writing, and a wastebasket around the icons in the central part (an example of such a screen image is shown in FIG. 7B). Accordingly, the touch screen 107 may be used to execute each file, transmit each file through Bluetooth® or other communication means, and display applications to attach when writing a message or an E-mail.

Figure 9A:
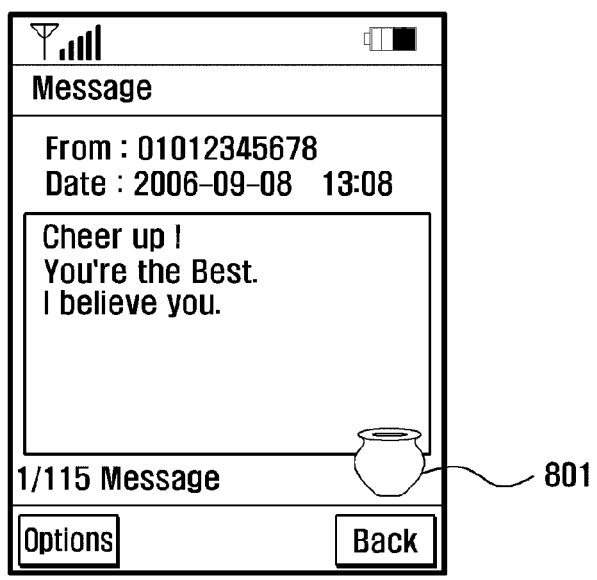
FIG. 9A, FIG. 9B, and FIG. 9C show examples of screens in the method of FIG. 8.
Figure 9B:
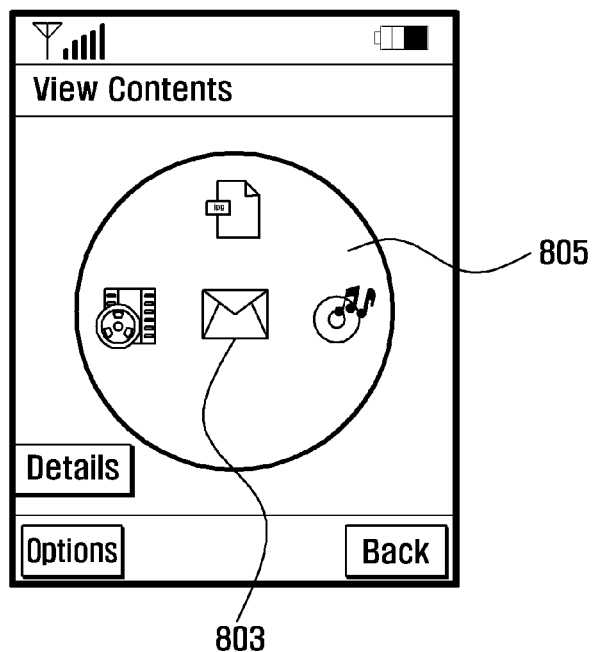

When a container is selected in a specific application execution mode, the touch screen 107 displays an icon of the specific application for execution at a central part of the screen and displays icons of related contents around the application icon in the central part. For example, if a container is selected in a message writing application, the touch screen 107 displays a message writing icon at a central part thereof. If contents stored in the container are an image file, a moving image file, and a music file, the touch screen 107 displays icons of each file around the message writing icon (an example of such a screen image is shown in FIG. 9B). That is, when a message is being written, the touch screen 107 displays contents that can be attached to the message.

The controller 113 controls general operations of units of the terminal. The controller 113 stores and executes contents. The controller 113 may cause a container to be displayed on the touch screen 107 in all modes. When a specific content is dragged and dropped to the container on the touch screen 107, the controller 113 stores the corresponding content in the container. The container may also store contents executed in other applications. In the present exemplary embodiment, when storing a content in the container, a method of dragging and dropping a content to the container on the touch screen 107 is exemplified, however the present invention is not limited thereto. For example, a method of selecting a specific content and inputting the content using a menu, then selecting and performing a function of storing the content in a container among various provided functions may be used.

When a container is selected in a standby mode, the controller 113 causes applications related to the stored content to be displayed in an icon form on the touch screen 107. When the controller 113 determines that a container is touched on the touch screen 107, the container is selected. As the amount of stored contents increases, the size of the container may increase. The container may display the amount of stored contents with the numeric quantity thereof for the purposes of simple estimation.

When a container is selected in a specific application execution mode, the controller 113 causes the stored contents related to the corresponding application to be displayed in an icon form on the touch screen 107. The related contents are contents that can be used in any form in the application for execution.

Figure 2:
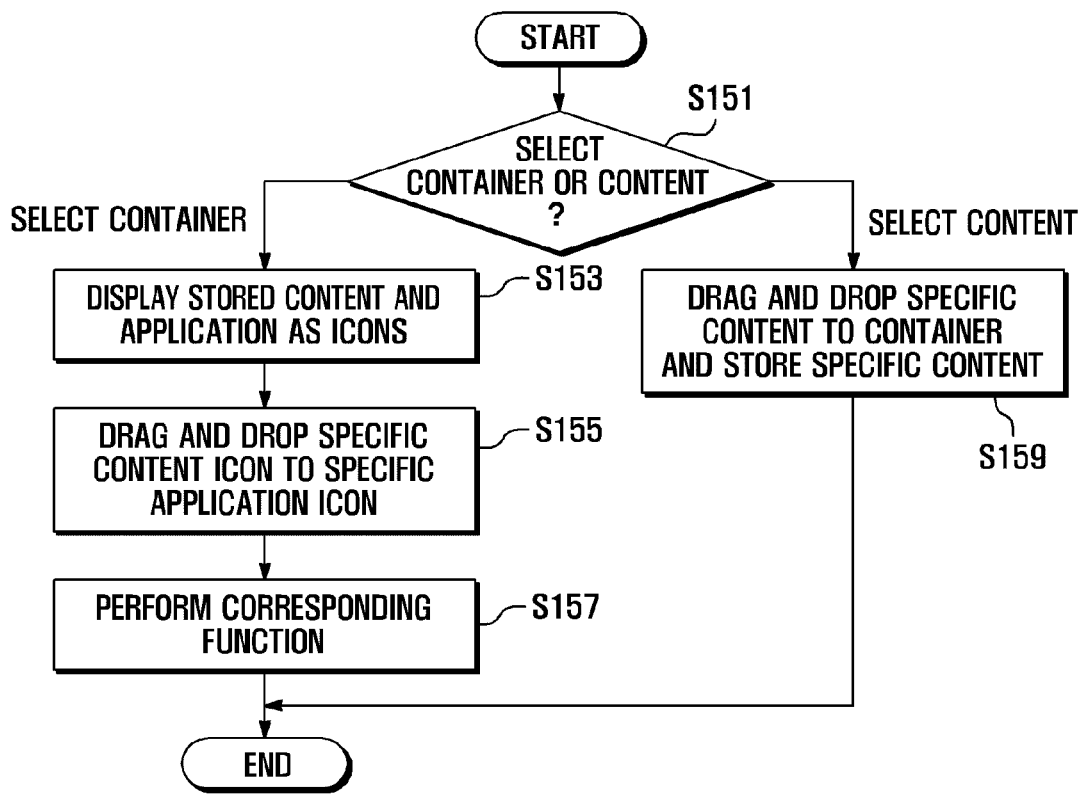
FIG. 2 is a flowchart showing a method of storing and executing contents of a terminal according to another exemplary embodiment of the present invention.

FIG. 2 is a flowchart showing a method of storing and executing contents of a terminal according to another exemplary embodiment of the present invention.

Referring to FIG. 1 and FIG. 2, the controller 113 determines whether the user selects a container or a content (S151). The container may be selected in all modes of the terminal, and the content may be selected in a specific application execution mode. In the present exemplary embodiment, the container is always displayed on the touch screen 107 in all modes of the terminal. However, the present invention is not limited thereto, and the container may be selectively displayed on the touch screen 107 by user setting.

If a container is selected, the controller 113 causes the stored content and an application corresponding thereto to be displayed as icons (S153). The contents may be an image file, a moving image file, a music file, phone number information, text information, and message information. The application may be an image viewer, a moving image viewer, an MP3 player, a phone book, text, a message, Bluetooth®, or a wastebasket. The application displayed in this process may be an application related to the stored content, however the application is not limited thereto.

The controller 113 determines that a specific content icon is dragged and dropped to a specific application icon by the user (S155). That is, the user selects a content to execute and an application to execute the corresponding content.

The controller 113 performs a corresponding function (S157). The processes of steps S153 to S157 are described in detail below in relation to FIG. 6 and FIG. 8.

If a content is selected at step S151, the controller 113 determines that the specific selected content is dragged and dropped to the container and is stored in the container by the user (S159). In order to store a specific content in the container in a specific application execution mode, the user drags and drops the specific content to the container on the touch screen 107. This process is described in detail below.

Figure 3:
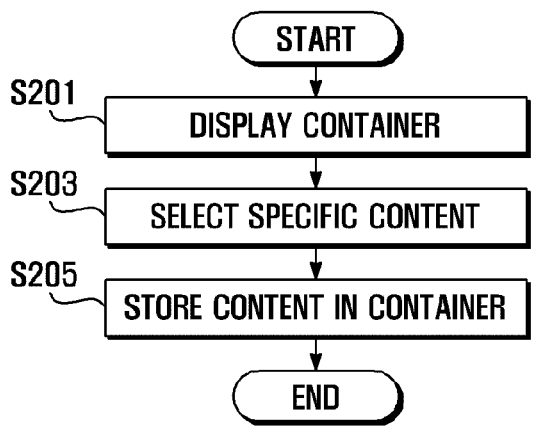
FIG. 3 is a flowchart showing a method of storing contents of a terminal according to another exemplary embodiment of the present invention.

FIG. 3 is a flowchart showing a method of storing contents of a terminal according to another exemplary embodiment of the present invention.

Figure 4A:
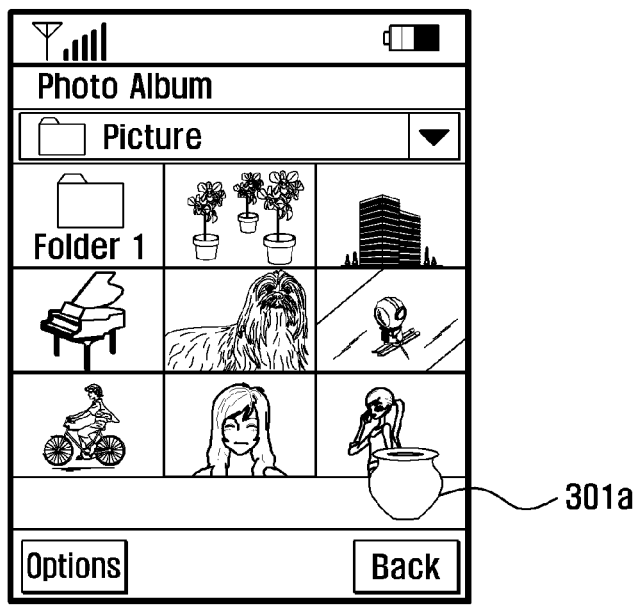
FIG. 4A, FIG. 4B, and FIG. 4C show examples of screens in which a container is displayed on a touch screen of the terminal in the method of FIG. 3.
Figure 4B:
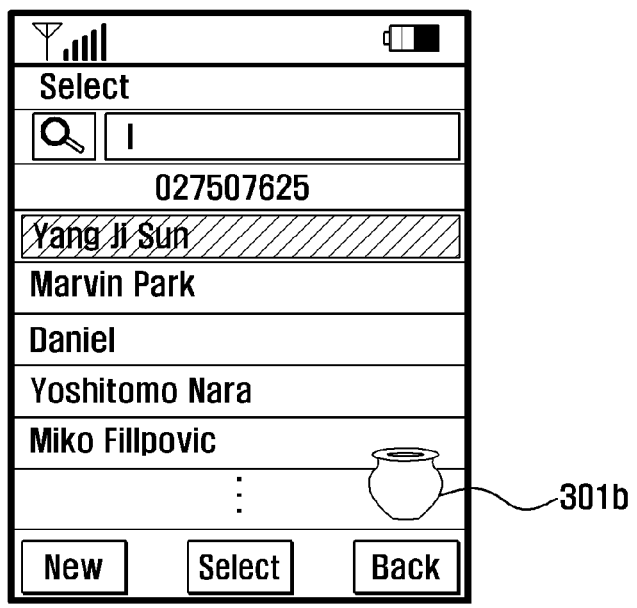
Figure 4C:
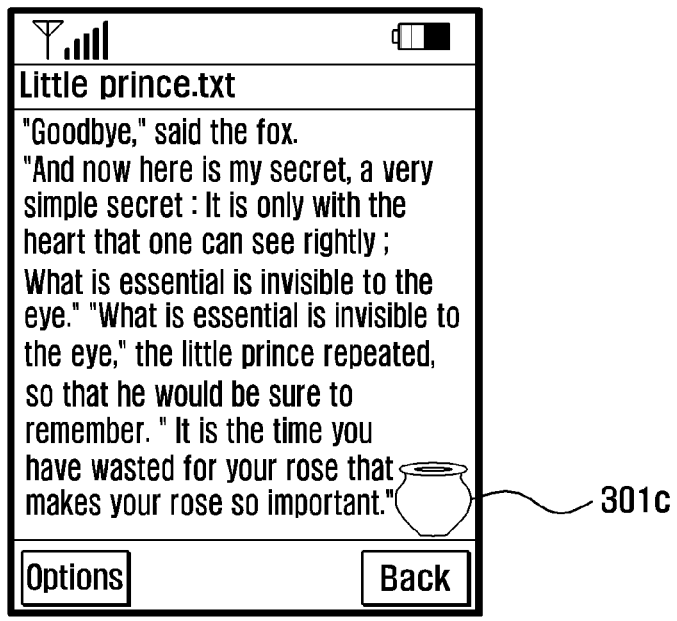
Figure 5A:
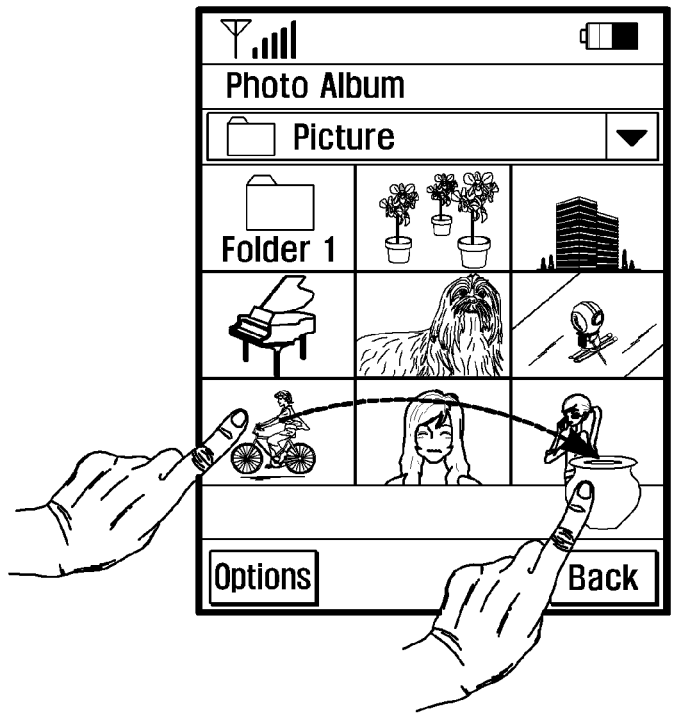
FIG. 5A, FIG. 5B, and FIG. 5C show examples of screens in which a content is stored in a container in the method of FIG. 3.
Figure 5B:
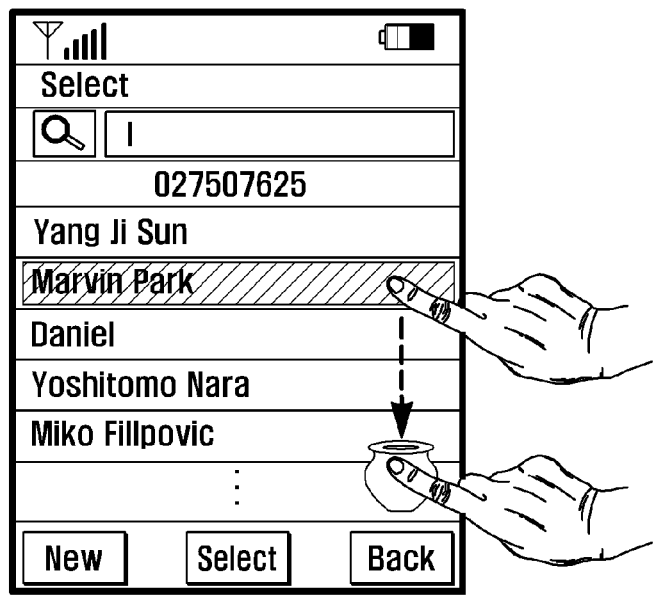
Figure 5C:
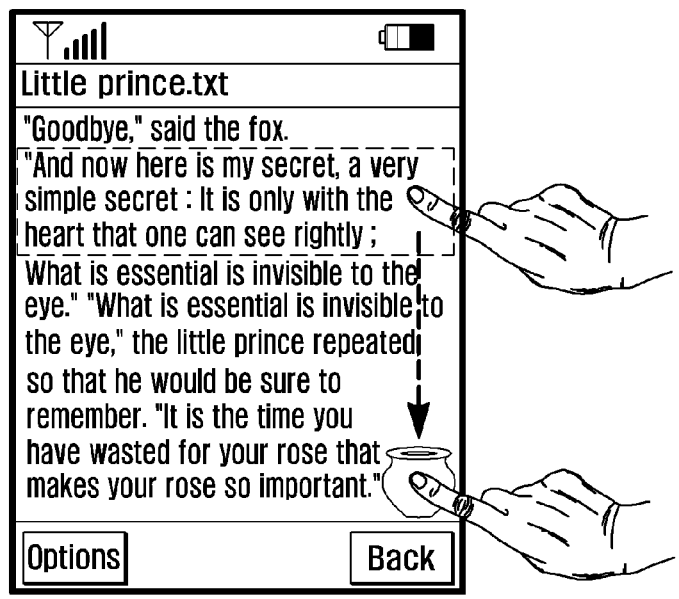

FIG. 4A, FIG. 4B, and FIG. 4C show examples of screens in which a container is displayed on the touch screen 107 of the terminal in the method of FIG. 3. FIG. 5A, FIG. 5B, and FIG. 5C show examples of screens in which a content is stored in a container in the method of FIG. 3.

Referring to FIG. 1, FIG. 3, FIG. 4A, FIG. 4B, FIG. 4C, FIG. 5A, FIG. 5B, and FIG. 5C, the controller 113 determines that a container is displayed on the touch screen 107 (S201). The container may be displayed in any mode provided by the terminal. FIG. 4A, FIG. 4B, and FIG. 4C show the touch screen 107 in which a container is displayed.

FIG. 4A shows a screen in which a container 301a is displayed in an image album viewer mode, FIG. 4B shows a screen in which a container 301b is displayed in a phone book mode, and FIG. 4C shows a screen in which a container 301c is displayed in a text mode.

The container may be displayed at a lower part of the right side of the touch screen 107 in all modes of the terminal to easily store any content. As contents stored in the container increase, the visible size of the displayed container increases so the user can visually know the amount of stored contents. Further, the container may display the number of the stored contents with the numerical quantity thereof. The container may store contents, which can be executed in various applications, together. The form of the container is not limited to the form shown in the drawings. The user may set the terminal such that the container is not displayed on the touch screen 107.

The controller 113 determines that a specific content is selected by the user (S203) and stores the selected content in the container (S205). Any content that exists in a specific mode may be selected by the user and stored in the container. In this case, the user drags and drops the content to the container on the touch screen 107 to store the content. FIG. 5A, FIG. 5B, and FIG. 5C show examples of such screens.

FIG. 5A shows a screen on which a user selects a specific image file to store by dragging and dropping to a container in an image album viewer mode, FIG. 5B shows a screen on which a user selects a specific phone number information to store by dragging and dropping to a container in a phone book mode, and FIG. 5C shows a screen on which a user selects specific text information to store by dragging and dropping to a container in a text mode.

Figure 6:
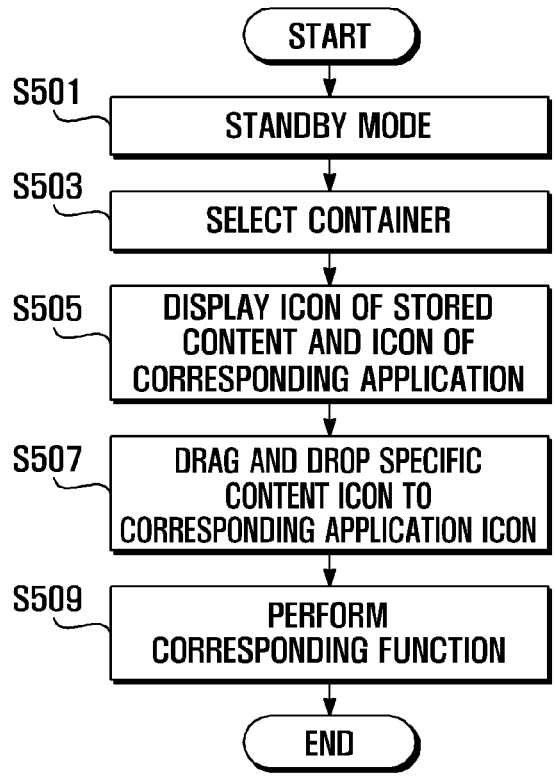
FIG. 6 is a flowchart showing a method of executing contents of a terminal according to another exemplary embodiment of the present invention.
Figure 7C:
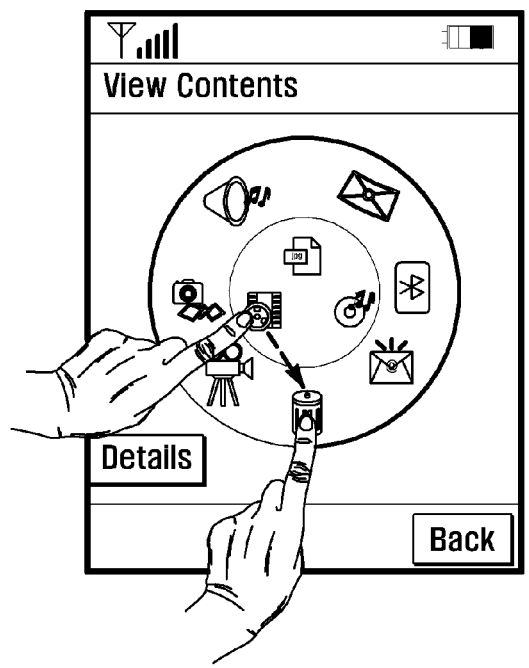

FIG. 6 is a flowchart showing a method of executing contents of a terminal according to another exemplary embodiment of the present invention. FIG. 7A, FIG. 7B, and FIG. 7C show examples of screens in the method of FIG. 6.

Referring to FIG. 1, FIG. 6, FIG. 7A, FIG. 7B, and FIG. 7C, the controller 113 determines that the terminal is in a standby mode (S501).

FIG. 7A shows a screen in which a container 601 is displayed in a standby mode.

The controller 113 determines that the container 601 is selected by the user (S503). The user can select the container 601 by touching the container 601 displayed on the touch screen 107.

The controller 113 causes an icon of the stored content and an icon of an application corresponding thereto to be displayed on the touch screen 107 (S505).

FIG. 7B shows a screen in which an icon of the stored content and an icon of an application are displayed on the touch screen 107 by selecting the container 601 in FIG. 7A. As shown in FIG. 7B, when an image file, a moving image file, and a music file are stored in the container 601, the controller 113 causes icons 603 of the corresponding files to be displayed at a central part of the touch screen 107 and display icons 605 of related applications around the icons 603. For example, icons of an image viewer, a moving image viewer, an MP3 player, Bluetooth®, message writing, E-mail writing, and a wastebasket may be displayed.

The controller 113 determines that a specific content icon is dragged and dropped to an application icon corresponding thereto by the user (S507). The user can select a specific content in order to execute the stored contents and select an application to execute the corresponding contents.

FIG. 7C shows a screen on which a user drags and drops a specific content icon to a specific application. As shown in FIG. 7C, the user may drag and drop a music file icon to a wastebasket icon.

The controller 113 performs the corresponding function (S509). As shown in FIG. 7C, the controller 113 deletes a music file that is dragged and dropped to a wastebasket by the user. When a music file is deleted, the music file is deleted from the container and the corresponding music file stored in the memory unit 105 is also deleted. However, in another exemplary embodiment, only a music file stored in the container may be deleted. FIG. 7C shows an example of deleting the music file stored in the container by dropping and dragging the music file icon to the wastebasket. In another example, when the user drags and drops a music file icon to an MP3 player, the controller 113 reproduces the corresponding music file. When a user intends to delete all contents stored in the container, contents can be deleted by dropping and dragging to the wastebasket.

Figure 8:
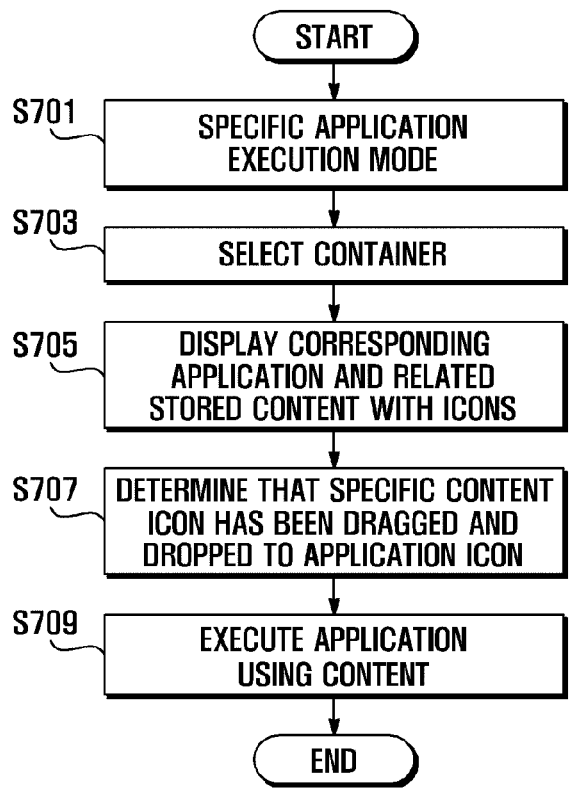
FIG. 8 is a flowchart showing another method of executing contents of a terminal according to another exemplary embodiment of the present invention.
Figure 9C:
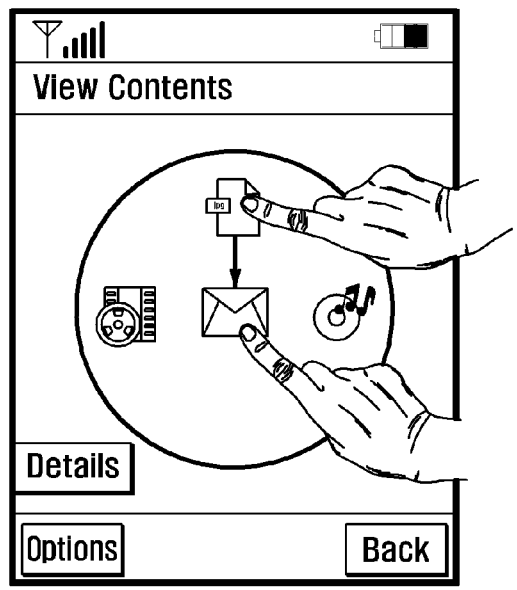

FIG. 8 is a flowchart showing another method of executing contents of a terminal according to another exemplary embodiment of the present invention. FIG. 9A, FIG. 9B, and FIG. 9C show examples of screens in the method of FIG. 8.

Referring to FIG. 1, FIG. 8, FIG. 9A, FIG. 9B, and FIG. 9C, the controller 113 determines that the terminal is in a specific application execution mode (S701).

FIG. 9A shows a screen in which a container 801 is displayed in a message writing mode.

The controller 113 determines that the container 801 is selected by the user (S703). The user can select the container 801 by touching the container 801 displayed on the touch screen 107.

The controller 113 stores an icon of the specific application execution mode determined at step S701 in the container 801 and causes an icon of a content related to the corresponding application to be displayed on the touch screen 107 (S705).

FIG. 9B shows a screen in which an icon of a message writing mode and a stored content icon related to a message writing application are displayed on the touch screen 107 by selecting the container 801 in FIG. 9A.

As shown in FIG. 9B, an icon 803 of a message writing mode is displayed at a central part of the touch screen 107, and an image file icon, a moving image file icon, and a music file icon 805 are displayed around the icon 803. Contents displayed by an icon are stored in the container and are related to the specific application execution mode, i.e. in the example, the message writing mode. That is, the contents can be attached to the message writing mode.

The controller 113 determines that a specific content icon is dragged and dropped to an application icon by the user (S707). The user can select a content to use in a message writing application among contents stored and displayed in the container and drag and drop the corresponding content to a message writing mode icon.

FIG. 9C shows a screen on which a user drags and drops a specific content icon to an application icon. As shown in FIG. 9C, the user may drag and drop an image file icon to an icon of the message writing mode.

The controller 113 executes the application using the selected content (S709). As shown in FIG. 9C, the controller 113 attaches an image file to a written message in a message writing mode. When a confirmation button is touched by the user, the controller 113 causes a message writing screen to which an image file is attached to be displayed on the touch screen 107. That is, the controller 113 causes a message writing screen to which the image file dragged and dropped to a message writing mode icon is attached to be displayed. The user can select other icons to attach to the message among the displayed icons by dropping and dragging. That is, as the user may sequentially drag and drop icons to attach to the message to the message writing mode icon and then touch a confirmation button. The controller 113 then causes a message writing screen to which the dragged and dropped files are attached to be displayed.

For example, when a specific application determined at step S701 is an image viewer mode, if a container is selected, the controller 113 causes an image viewer icon to be displayed at a central part of the touch screen 107 and display a stored image file and music file with a corresponding icon around the image viewer icon. If a specific content is dragged and dropped to the image viewer icon by the user, the controller 113 may generate a slide show or a moving image.

When a specific application determined at step S701 is an MP3 player mode, if a container is selected, the controller 113 causes an MP3 player icon to be displayed at a central part of the touch screen 107 with the stored image file and music file with a corresponding icon around the MP3 player icon. If a specific content is dragged and dropped to the MP3 player icon by the user, the controller 113 may continuously reproduce music or display the dragged and dropped images on the touch screen 107 as a background screen thereof while reproducing music.

Figure 10A:
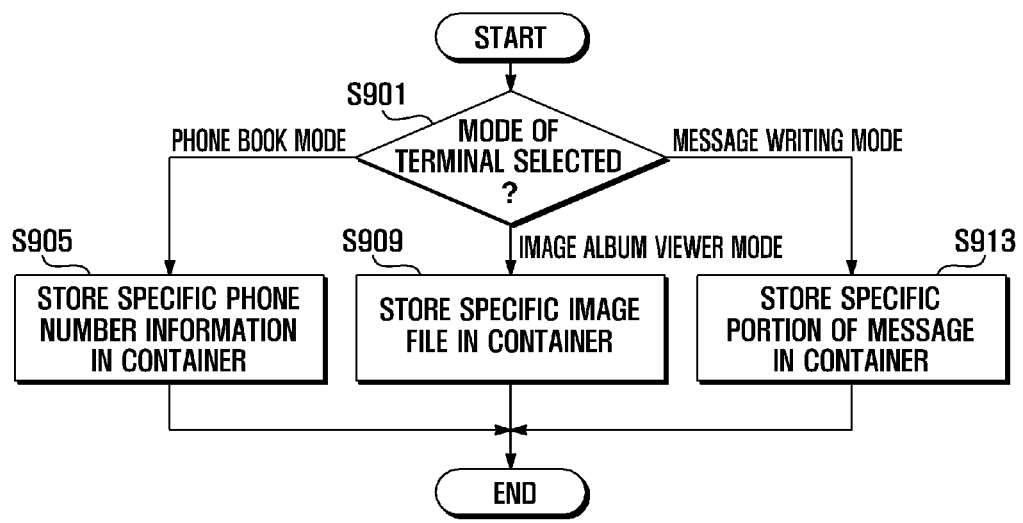
FIG. 10A and FIG. 10B are flowcharts showing another method of storing and executing contents of a terminal according to another exemplary embodiment of the present invention.
Figure 10B:
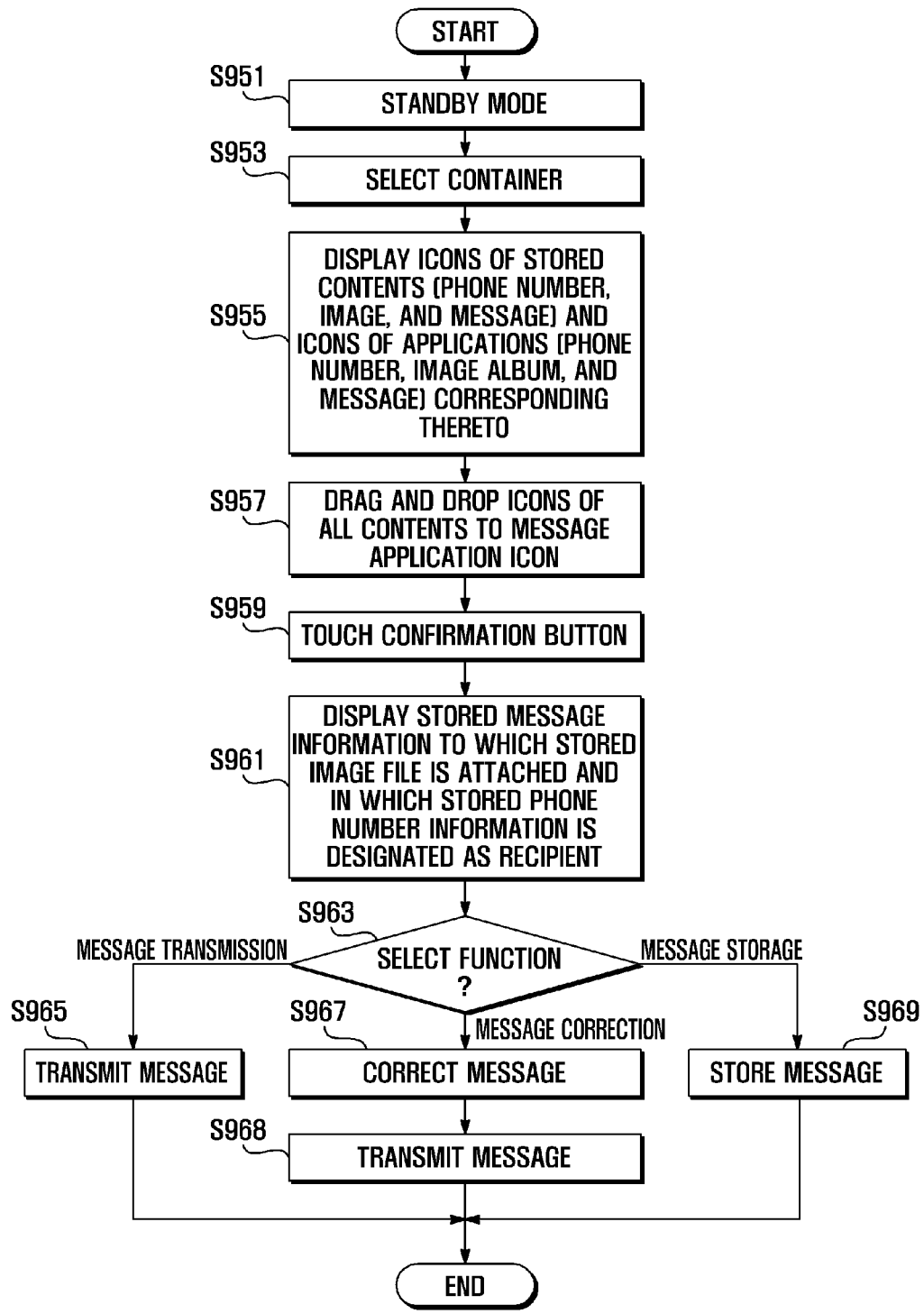

FIG. 10A and FIG. 10B are flowcharts showing another method of storing and executing contents of a terminal according to another exemplary embodiment of the present invention.

Referring to FIG. 1, FIG. 10A, and FIG. 10B, upon selection by a user of a mode of the terminal, the controller 113 determines which mode of the terminal is selected by the user (S901). The mode is any mode that can be provided by the terminal, and in the present exemplary embodiment, a phone book mode, an image album viewer mode, and a message writing mode are exemplified.

If the mode is a phone book mode, the controller 113 stores specific phone number information in the container (S905). As shown in FIG. 5B, when specific phone number information is dragged and dropped to the container by the user in a phone number mode, the controller 113 stores the corresponding phone number information in the container.

If the mode is an image album viewer mode, the controller 113 stores a specific image file in the container (S909). As shown in FIG. 5A, when a specific image is dragged and dropped to the container by the user in an image album viewer mode, the controller 113 stores the corresponding image file in the container.

If the mode is a message writing mode, the controller 113 stores a specific portion of the message in the container (S913). When the specific portion of the message is dragged and dropped to the container by the user in the message writing mode, the controller 113 stores the corresponding message information in the container. Here, the selected mode is not limited to the message writing mode, but may be performed in a display mode of a received or stored message. An entire message or a specific portion of a message may be stored in the container.

The controller 113 may store specific phone number information, a specific image file, and message information in the container through the above process.

Referring to FIG. 10B, the controller 113 determines that the terminal is in a standby mode (S951).

The controller 113 determines that a container is selected by the user (S953). The user can select a container by touching the container displayed in the touch screen 107.

The controller 113 controls to display an icon of a stored content and an icon of an application corresponding thereto on the touch screen 107 (S955).

The controller 113 causes the stored phone number information icon, image file icon, and message information icon to be displayed at a central part of the touch screen 107 and display a phone book icon, image viewer icon, message writing mode icon, and wastebasket icon around the icons of the central part.

The controller 113 determines that icons of all contents are dragged and dropped to the message writing mode icon by the user (S957). The user drags and drops the stored and displayed phone number information icon, image file icon, and message information icon to the message writing mode icon.

When the controller 113 determines that a confirmation button is touched by the user (S959), the controller 113 causes stored message information to which the stored image file is attached and in which the stored phone number information is designated as a recipient to be displayed on the touch screen 107 (S961). That is, the controller 113 causes a stored message writing screen to be displayed on the touch screen 107. In the message, the image file is attached and the stored phone number information is designated as a recipient.

Upon selection by the user of a function, the controller 113 determines which function is selected by the user (S963).

If a message transmission function is selected, the controller 113 transmits the message displayed at step S961 to the designated phone number (S965).

If a message correction function is selected, the controller 113 corrects the message displayed at step S961 (S967) in response to user input. After the message is corrected, the controller 113 transmits the corrected message to the designated phone number (S968).

If a message storage function is selected, the controller 113 stores the message displayed at step S961 in the memory unit 105 (S969).

The present exemplary embodiment described here with reference to FIG. 10B exemplifies selection of a message writing application. However, the present invention is not limited thereto, and other application modes, such as a phone book application and an image viewer application at step S955 in FIG. 10B, may be selected.

According to exemplary embodiments of the present invention, multiple contents may be stored and executed at one time and may be easily managed. Particularly, contents executed in different applications may be stored together and several contents may be deleted at one time, thereby improving user convenience.

After a plurality of contents for transmission are stored, the contents may be transmitted together to another terminal. Further, after a plurality of contents including an image file, a message, and a phone number are stored together, the message to which the stored image file is attached may be transmitted to the stored phone number.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of storing contents of a terminal, the method comprising:
    detecting an input of a selection of a mode of the terminal and determining which mode being selected;
    storing one or more contents in a container corresponding to the selected mode; and
    in response to detection of a selection of the container, displaying icons of the one or more contents of the selected mode at a central part of a display area of the terminal; and
    displaying icons of at least one application corresponding to the one or more contents around the icons of the one or more contents of the selected mode.

2. The method of claim 1, wherein the one or more contents are stored in the container in response to detection of icons of the selected content being dragged and dropped on the container on the display area of the terminal.

3. The method of claim 2, wherein the container is displayed on the display area of the terminal in all modes.

4. The method of claim 2, wherein the container stores the one or more contents, which are executed in different applications, together.

5. The method of claim 1, further comprising:
    executing an application to open the selected one or more contents in response to a displayed icon of the selected content being dragged and dropped on an icon of the application corresponding to the selected content.

6. The method of claim 1, further comprising:
    determining if the terminal operates in at least one of a phone book mode, an image viewer mode, and a messaging mode;
    if the terminal is determined to operate in the phone book mode, storing phone number information in the container in response to the phone number information being dragged and dropped on the container;
    if the terminal is determined to operate in the image viewer mode, storing an image file in the container in response to the image file being dragged and dropped on the container; and
    if the terminal is determined to operate in the messaging mode, storing a selected portion of a message in the container in response to the selected portion of the message being dragged and dropped on the container.

7. A method of executing contents of a terminal, the method comprising:
    determining an input of a selection of which mode of the terminal;
    storing one or more contents in a container corresponding to the selected mode;
    displaying icons of the one or more contents of the selected mode at a central part of a display area of the terminal in response to receipt of a selection of the container;
    displaying icons of the at least one application corresponding to the one or more contents around the icons of the one or more contents of the selected mode; and
    receiving an execution associated with drag or drop of icons in response to selection of the one or more contents and an application corresponding thereto.

8. The method of claim 7, wherein the one or more contents are executed in response to detection of icons of the one or more contents being dragged and dropped on an icon of the at least one application corresponding to the respective contents.

9. The method of claim 7, further comprising:
displaying an icon of the at least one application at a central part of the screen in response to selection of the container in an execution mode for the application; and
displaying icons of the one or more contents of the selected mode around the icon of the at least one application.

10. The method of claim 9, wherein the one or more contents are executed in response to detection of an icon of the one or more contents being dragged and dropped on an icon of the at least one application corresponding to the respective contents.

11. A terminal, comprising:
a screen to detect an input of a selection of a mode of the terminal; and
a controller to store one or more contents in a container in response to detection of the selected mode, and
upon detection of a selection of the container, icons of the one or more contents of the selected mode are distinctively displayed from icons of at least one application, wherein the controller is configured to display icons of the one or more contents of the selected mode at a central part of the screen, and to display icons of the at least one application around the icons of the one or more contents of the selected mode.

12. The terminal of claim 11, wherein the controller is configured to store the one or more contents in response to detection of icons of the selected one or more contents being dragged and dropped to the container.

13. The terminal of claim 12, wherein the container is displayed on the screen of the terminal in all modes.

14. The terminal of claim 12, wherein the container stores the one or more contents, which are executed in different applications, together.

15. A terminal, comprising:
a touch screen to detect an input of a selection of a mode of the terminal; and
a controller to determine which mode being selected and to store one or more contents in a container in response to determination of the selected mode,
wherein the controller is configured to control the touch screen to distinctively display icons of the one or more contents of the selected mode from icons of at least one application corresponding to the one or more contents in a different portion of a display area to receive an execution associated with drag or drop of icons of the selected container, wherein the controller is further configured to display icons of the one or more contents of the selected mode at a central part of the touch screen, and to display icons of the at least one application around the icons of the one or more contents.

16. The terminal of claim 15, wherein the controller is configured to execute the one or more contents in response to detection of icons of the one or more contents being dragged and dropped to an icon of the at least one application corresponding to the respective contents.

17. The terminal of claim 15, wherein the controller is configured to display an icon of the at least one application at a central part of the touch screen in response to selection of the container in an execution mode, and to display icons of the one or more contents of the selected mode around the icon of the at least one application.

18. The terminal of claim 17, wherein the controller is configured to execute the one or more contents in response to detection of icons of the one or more contents being dragged and dropped to the icon of the at least one application corresponding to the respective contents.

* * * * *